US007818555B2

(12) United States Patent
Cai et al.

(10) Patent No.: US 7,818,555 B2
(45) Date of Patent: Oct. 19, 2010

(54) METHOD AND APPARATUS FOR CHANGING A CONFIGURATION OF A COMPUTING SYSTEM

(75) Inventors: William Cai, Shanghai (CN); James Tang, Shanghai (CN); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 592 days.

(21) Appl. No.: 11/770,656

(22) Filed: Jun. 28, 2007

(65) Prior Publication Data

US 2009/0006829 A1  Jan. 1, 2009

(51) Int. Cl.
*G06F 11/00* (2006.01)
(52) U.S. Cl. ............... 713/1; 713/2; 714/3; 714/10; 714/49; 718/1; 718/100
(58) Field of Classification Search ............ 713/1, 713/2; 714/3, 10, 49; 718/1, 100
See application file for complete search history.

(56) References Cited

U.S. PATENT DOCUMENTS

| | | | | |
|---|---|---|---|---|
| 5,664,195 A | * | 9/1997 | Chatterji | 717/178 |
| 6,119,219 A | * | 9/2000 | Webb et al. | 712/227 |
| 6,122,732 A | * | 9/2000 | Ahuja | 713/1 |
| 7,640,453 B2 | * | 12/2009 | Li et al. | 714/10 |
| 2004/0210890 A1 | * | 10/2004 | Armstrong et al. | 717/168 |
| 2004/0228359 A1 | * | 11/2004 | Korb et al. | 370/406 |

* cited by examiner

*Primary Examiner*—Abdelmoniem Elamin
(74) *Attorney, Agent, or Firm*—Blakely, Sokoloff, Taylor & Zafman LLP (57) ABSTRACT

Machine-readable media, methods, apparatus and system for caption detection are described. In some embodiments, during a non-quiesce state of a system, a configuration data for a configuration update of a configurable device of the system may be calculated, and it may be determined whether the configuration data is final configuration data or intermediate configuration data, wherein the final configuration data may be used to directly enact the configuration update during a quiesce state of the system, while the intermediate configuration data is used to indirectly enact the configuration update during the quiesce state of the system. Further, during the non-quiesce state of the system, if the configuration data is the intermediate configuration data, then codes associated with the configuration data may be determined, wherein the codes may be used to operate the configuration data to obtain the final configuration data during the quiesce state of the system.

19 Claims, 6 Drawing Sheets

METHOD AND APPARATUS FOR CHANGING A CONFIGURATION OF A COMPUTING SYSTEM

BACKGROUND

A computing system may require high levels of reliability, availability and serviceability (RAS) features. In many cases, RAS-related operations may require changes to the system configuration such as, for example, adding memory, removing memory, adding a processor, and removing a processor. Some known computing systems may provide an interrupt mechanism that enables the OS to be put into a quiescent state so that certain RAS features can be implemented in an OS transparent manner. Normally, due to real-time demands, the OS may impose latency limitations for the interrupt mechanism.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for changing a configuration of computing system. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in configurable device, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
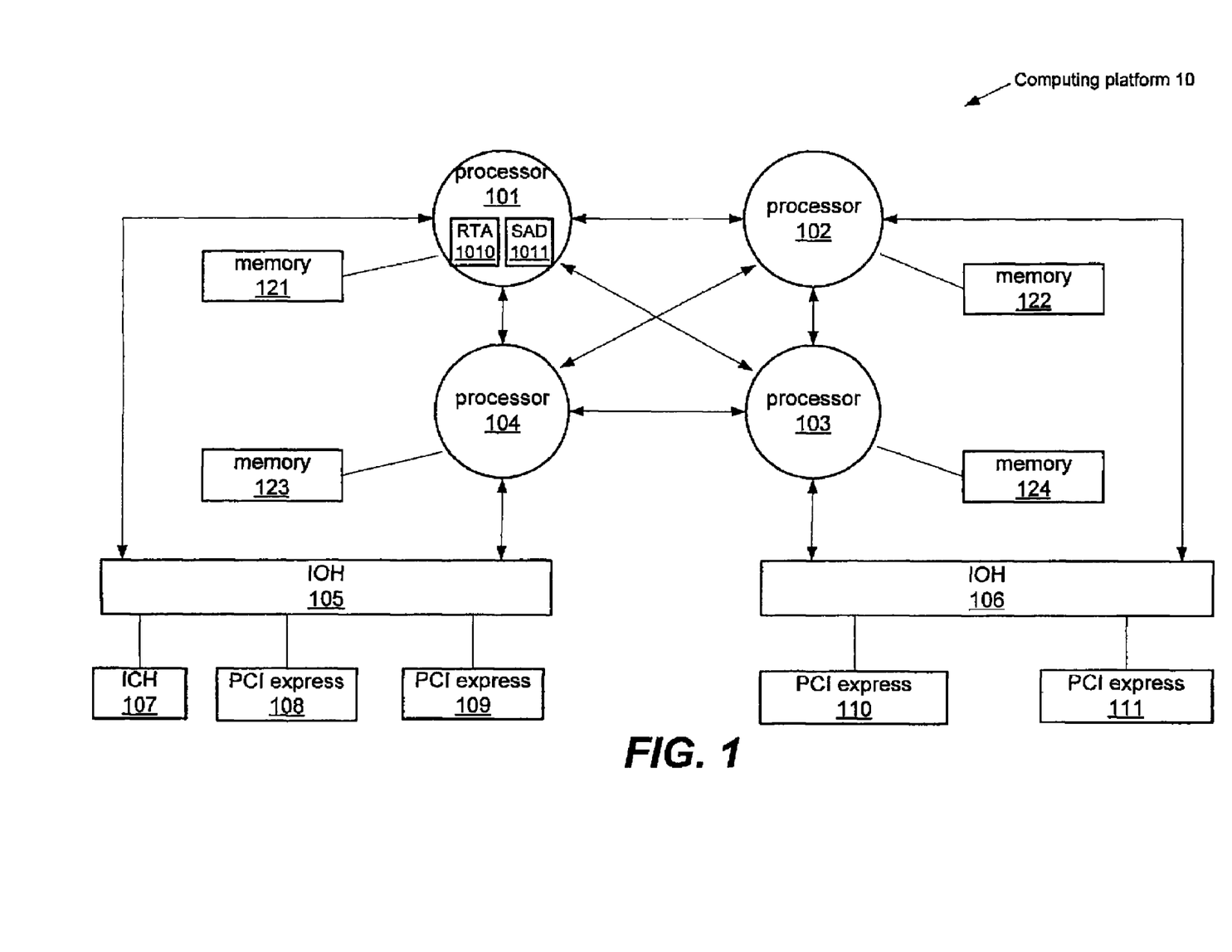
FIG. 1 is an embodiment of a computing system having a common system interface (CSI) link based architecture.

FIG. 1 illustrates an embodiment of a CSI link based computing system 10. Computing system 10 may comprise four processors 101-104 and two input/output hubs (IOH's) 105 and 106. In addition, each of the processors may be operatively coupled to a respective memory controller 121, 122, 123 and 124. IOH's 105 and 106 may provide connectivity to input/output (I/O) devices such as PCI Express 108, 109, 110 and 111, and I/O controller hubs (ICH's) such as ICH 107.

Communication among processors 101, 102, 103 and 104 and communication between processors 101, 102, 103 and 104 and IOH's 105 and 106 may be implemented using CSI packets. Each of the CSI components, i.e., the components that may communicate by using the CSI packets (e.g., processors 101, 102, 103 and 104, the IOH's 105 and 106, etc.), may contain a routing table array (RTA) and a source address decoder (SAD) (e.g., RTA 1010 and SAD 1011 within processor 101). RTA may process the CSI packet routing information to other sockets and SAD may provide a mechanism to represent routing of the resources such as memory, I/O, etc.

In order to implement configuration changes within system 10, it may require forcing system 10 into a quiesce state. For example, if processor 102 is to be removed from service while the OS of system 10 is running, RTAs and SADs associated with other CSI components may be reconfigured so that entries related to the processor 102 and memory 122 are updated or removed.

CSI components of system 10 may support a quiesce mode in which normal communication traffic may be paused to perform the reconfiguration. Further, during the quiesce mode, execution of the OS may be suspended and the number of hardware events may be minimized.

It should be appreciated that computing system 10 may comprise any number of processors, memories, IOH's, etc.

Figure 2:
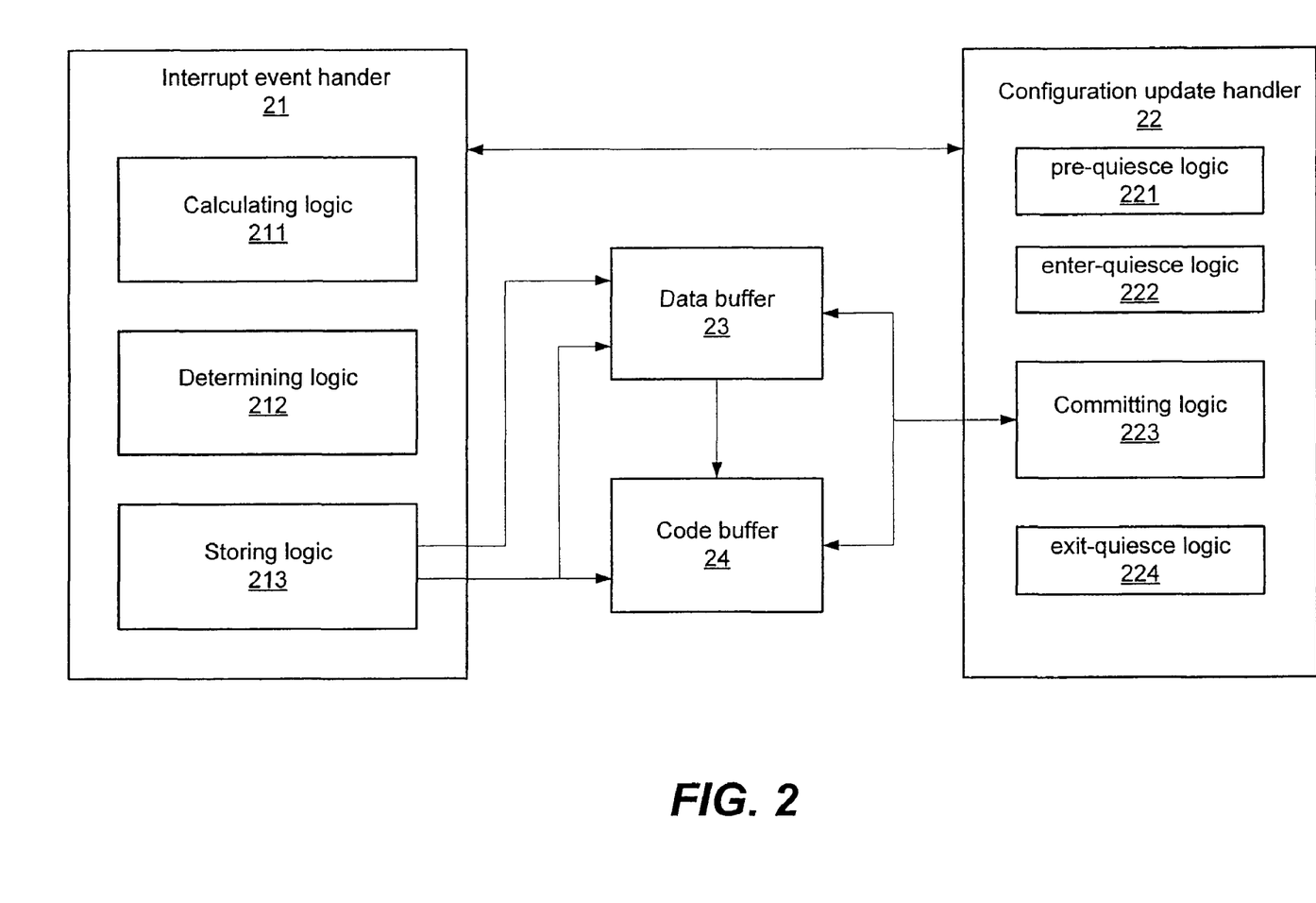
FIG. 2 is an embodiment of an apparatus and method of reconfiguring the computing system.

FIG. 2 illustrates an embodiment of an apparatus and method of reconfiguring computing system 10, in which the apparatus may comprise interrupt event handler 21, configuration update handler 22, data buffer 23 and code buffer 24. Interrupt event handler 21 and configuration update handler 22 may be implemented via codes or software stored on a computer readable medium and executed by a processor.

When an interrupt event happens, e.g., removal of processor 101, an interrupt call is generated, such as a system management interrupt (SMI) call, or a platform management interrupt (PMI) call. In response to the interrupt call, controls of the system 10 may be transferred from the OS to a SMI or PMI handler (e.g., interrupt event handler 21) and the whole system may enter into a system management mode. During the system management mode, interrupt event handler 21 may calculate the new configuration data, determine codes used to further operate the new configuration data if the new configuration data can not be directly applied to a configurable device (e.g., RTA or SAD) and store the data and codes respectively in data buffer 23 and code buffer 24, which may be described in details below.

Calculating logic 211 of interrupt event handler 21 may calculate the new configuration data for each reconfiguration operation. Taking the reconfiguration of RTA as an example, routes whose destinations are the removed processor may be deleted and routes passing through the removed processor may be replaced with routes passing through other resources (e.g., other processors and/or other memories). Then, determining logic 212 of interrupt event handler 21 may determine if the configuration data can be directly applied to the configurable devices (e.g., RTA) for the reconfiguration. In response that the configuration data can be directly applied, determining logic 212 may determine a data indicator to indicate that the configuration data is a final configuration data, for which a simple operation may be needed to commit the configuration data (e.g., enroll the configuration data to a register of the configurable device).

In response that the configuration data can not be directly applied to the configurable device, determining logic 212 may determine another data indicator to indicate that the configuration data is an intermediate data, for which a complicated operation may be needed before committing the configuration data. For example, the configuration data may be polled or stalled before being committed. Determining logic 212 may further determine codes for the complicated operation, such as the polling or stalling codes, and a code identifier to identify the codes. Examples of the code identifier may include an address of a memory storing the codes (not shown). The memory may be associated with interrupt event handler 21, for example, to store codes and data for interrupt event handler 21.

Then, interrupt event handler 21 may call configuration update handler 22 while inputting the data indicator, the register address, the configuration data and the code identifier (if any), in which the register address may refer to the address of the register of the configurable device.

Configuration update handler 22 may instruct interrupt event handler 21 how to fill a segment of data buffer 23 and a segment of code buffer 24 based upon an analysis of the input from interrupt event handler 21, so that interrupt event handler 21 may respectively store the configuration data and the codes in data buffer 23 and code buffer 24 as instructed.

In particular, pre-quiesce logic 221 of configuration update handler 22 may determine if the configuration data is final configuration data or intermediate configuration data based upon the data indicator. If the configuration data is the final configuration data, pre-quiesce logic 221 may instruct interrupt event handler 21 to write the data indictor, the register address and the configuration data into a data segment of data buffer 23, as shown in FIG. 3.

Figure 3:
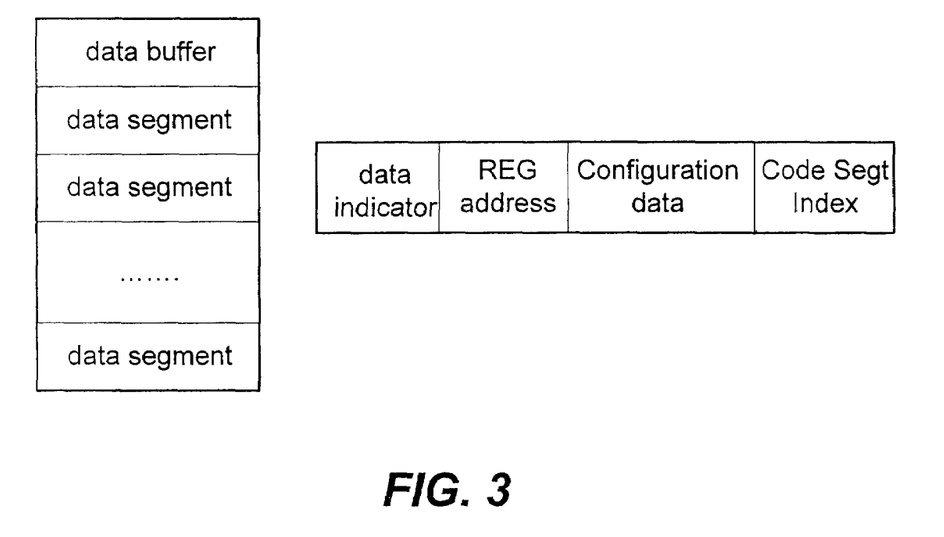
FIG. 3 is an embodiment of a data buffer.

FIG. 3 shows an embodiment of data buffer 23 and its data segments. As shown, data buffer 23 may comprise multiple data segments, and each data segment may have four data sub-segments respectively for data indicator, register (REG) address, configuration data and code segment (SEGMT) index. The data indicator may comprise one or more binary bits with different bit values representing different data types. For example, value "0" may represent final configuration data and value "1" may represent intermediate configuration data. If the configuration data is the final configuration data, then the data sub-segment for the code segment index may be neglected (e.g., data stored in this sub-segment may be meaningless).

Figure 4:
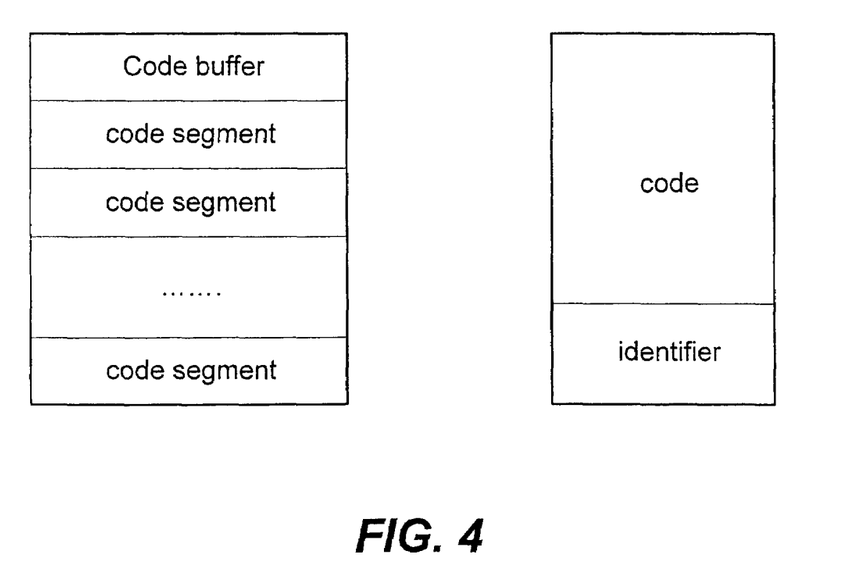
FIG. 4 is an embodiment of a code buffer.

If the configuration data is the intermediate configuration data, then pre-quiesce logic 221 may search code buffer 24 for a code segment storing a code identifier matching the code identifier received from interrupt event handler 21. FIG. 4 shows an embodiment of code buffer 24. As shown, code buffer 24 may comprise multiple code segments and each code segment may have two code sub-segments respectively for code and code identifier.

If pre-quiesce logic 221 finds the code segment, pre-quiesce logic may assume that codes needed for operating the configuration data before committing the data for reconfiguration are already stored in code buffer 24. With such assumption, pre-quiesce logic 221 may instruct interrupt event handler 21 to write the data indicator, register address, configuration data and the index of the code segment into a data segment of data buffer 23, as shown in FIG. 3.

However, if pre-quiesce logic 221 can not find the code segment whose code identifier matches the one received from interrupt event handler 21, pre-quiesce logic 221 may instruct interrupt event handler 21 to copy the codes from the memory associated with interrupt event handler 21 to a code segment of code buffer 24. Pre-quiesce logic 221 may further instruct interrupt event handler 21 to copy the code identifier associated with the codes to the code segment. Pre-quiesce 221 may send the index of the code segment to interrupt event handler 21 and instruct it to write the data indicator, the configuration data, the register address, and the code segment index to a data segment of data buffer 23, as shown in FIG. 3.

As instructed by configuration update handler 22, storing logic 213 of interrupt event handler 21 may store the configuration data, the codes and other related information in data buffer 23 and code buffer 24.

The above-described process may be repeated until all of the configuration data and codes (if any) needed for all of the reconfiguration operations are stored. Since SMI or PMI may impose a time limitation, prior to the lapse of a predetermined time period, interrupt event handler 21 and configuration update handler 22 may cease the calculations and storage operations and return control of the system to the OS. If further calculations and storage operations are needed, interrupt event handler 21 may schedule another SMI or PMI. When the scheduled interrupt triggers another SMI or PMI, interrupt event handler 21 or configuration update handler 22 may continue from where it left off.

Then, interrupt event handler 21 may call configuration update handler 22 to reconfigure the configurable device. In response to the call, enter-quiesce logic 222 may force the system into a quiesce state, during which normal communication traffic may be paused in order to perform the reconfiguration.

In particular, committing logic 223 of configuration update handler 22 may retrieve data indictor, configuration data, register address and code segment index from a data segment of data buffer 23 and determine if the data indicator indicates that the configuration data is final or intermediate configuration data. If the configuration data is the final configuration data, then committing logic 223 may commit the reconfiguration by directly writing the configuration data to the register address associated with the configurable device.

However, if the configuration data is the intermediate configuration data, then committing logic 223 may retrieve codes from a code segment of code buffer 24, in which the code segment is indexed with the code segment index contained in the data segment. Committing logic 223 may apply the configuration data and register address to the codes in order to commit the reconfiguration. For example, the codes may poll the configuration data and then write the polled data to the register address associated with the configurable device.

After the reconfiguration, exit-quiesce logic 224 may force the system out of the quiesce state. Later, control of the system may be returned to the OS and normal traffics may be resumed.

With the apparatus and method as depicted in FIG. 2, data calculation is separated from data commitment. More particularly, calculation of the configuration data may be performed during the non-quiesce state while commitment of the configuration data for reconfiguration may be performed during the quiesce state, which may reduce the time needed in the quiesce state and therefore meet real-time demands on the OS. Further, due to the insertion of code buffer 24, complicated operations (e.g., polling, stalling, etc.) may be applied to the calculated data before the data commitment without destroying the real system. Moreover, each code segment associates the code identifier to the stored codes, which may avoid code duplication if the same codes may be applicable to different configuration data.

Other embodiments may implement other technologies to the apparatus and method of reconfiguring the system. For example, interrupt event handler 21 may determine how to store the configuration data and codes in data buffer 23 and code buffer 24 without consulting configuration update handler 22. For another example, it may be configuration update handler 22, but not interrupt event handler 21, that stores the configuration data and/or the codes in data buffer 23 and code buffer 24.

For yet another example, interrupt event handler 21 may determine an operation indicator, rather than a data indicator, to indicate whether a simple or complicated operation is needed to commit the configuration data for the reconfiguration. Further, the simple operation may comprise more operations than writing the configuration data to the register of the configurable device, in which case, the operation indicator may use different bit values to indicate different simple operations.

For still yet another example, the data and codes may be stored in one buffer rather than in two buffers. In such case, a flag may be used to identify if its associated content is data or codes.

Figure 5:
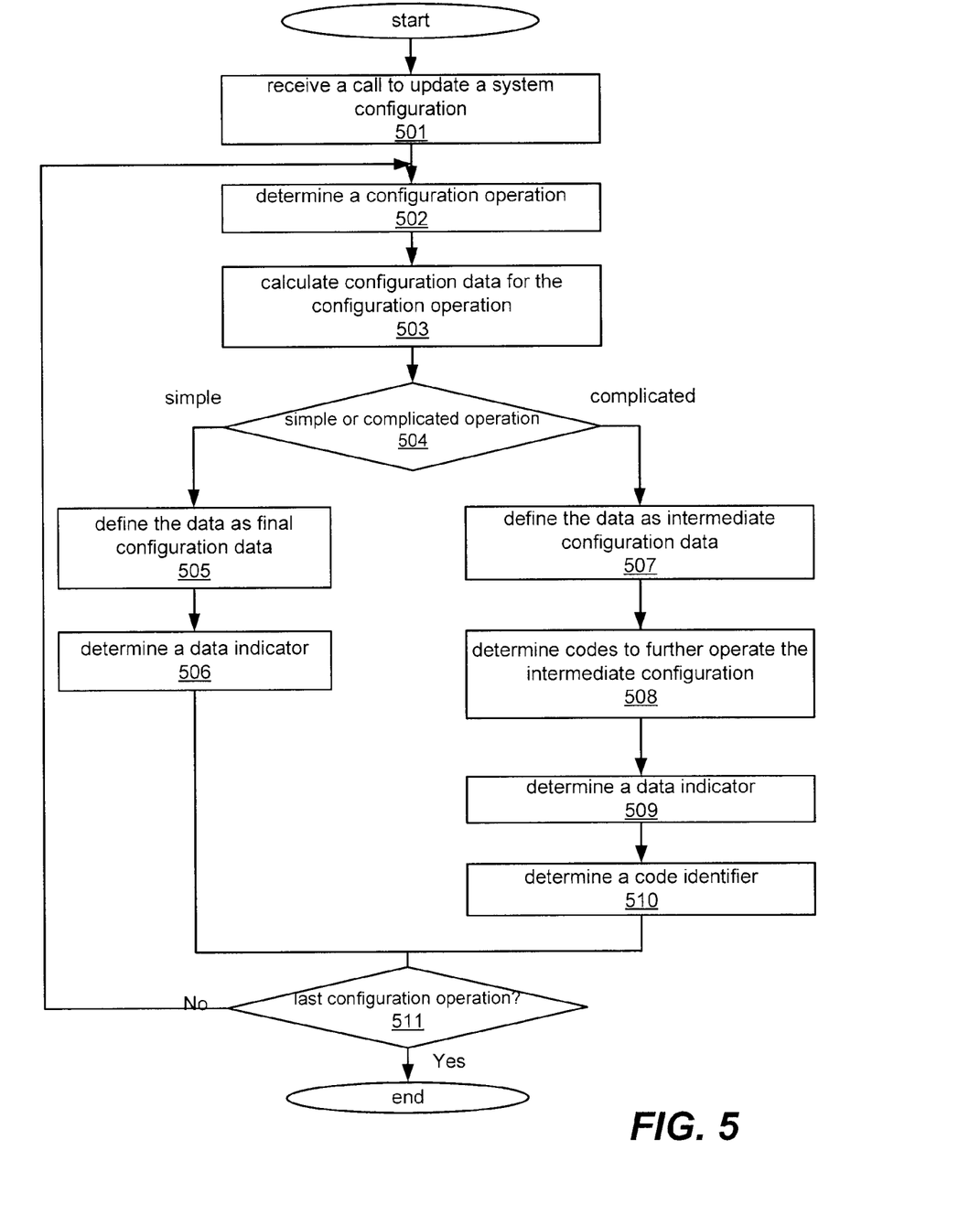
FIG. 5 is an embodiment of a method of calculating configuration data.

FIG. 5 illustrates an embodiment of a method of calculating configuration data. In block 501, interrupt event handler 21 may receive a call to update a system configuration. For example, if a processor is to be removed, RTA and/or SAD of the remaining CSI components may be reconfigured.

In block 502, in response to the call, interrupt event handler 21 may determine a configuration operation to reconfigure the system (e.g., update a route in RTA which passes through the removed processor). In block 503, interrupt event handler 21 may calculate a new configuration data for the configuration operation. For example, a new route passing through other resources (e.g., remaining processor(s)) may be calculated. In block 504, interrupt event handler 21 may determine if simple or complicated operation(s) to the configuration data is needed to commit the reconfiguration.

For example, if the configuration data can be directly applied to the configurable device (e.g., RTA or SAD), interrupt event handler 21 may determine a simple operation is needed, such as, writing the configuration data to a register of the configurable device. However, if the configuration data can not be directly applied to the configurable device, for example, the configuration data may need to go through "polling" or "stalling" operations before being written to the register of the configurable device, interrupt event handler 21 may determine a complicated operation is needed.

For simple operation, interrupt event handler 21 may define the configuration data as final configuration data in block 505, and may determine a data indicator to indicate that the configuration data is final configuration data which can be directly applied to the configurable device for the reconfiguration in block 506.

For complicated operation, interrupt event handler 21 may define the configuration data as intermediate configuration data in block 507, determine codes used to operate the configuration data before being committed for the reconfiguration in block 508, and determine another data indicator to indicate that the configuration data is the intermediate configuration data which can not be directly applied to the configurable device in block 509. In block 510, interrupt event handler 21 may determine a code identifier to identify the codes. The code identifier may take any forms, such as a memory address storing the codes. The memory may be associated with interrupt event handler 21, for example, to store codes and data for interrupt event handler 21. Then, in block 511, interrupt event handler 21 may determine if the configuration operation determined in block 502 is the last configuration operation and repeat blocks 502-509 if it is not.

Figure 6:
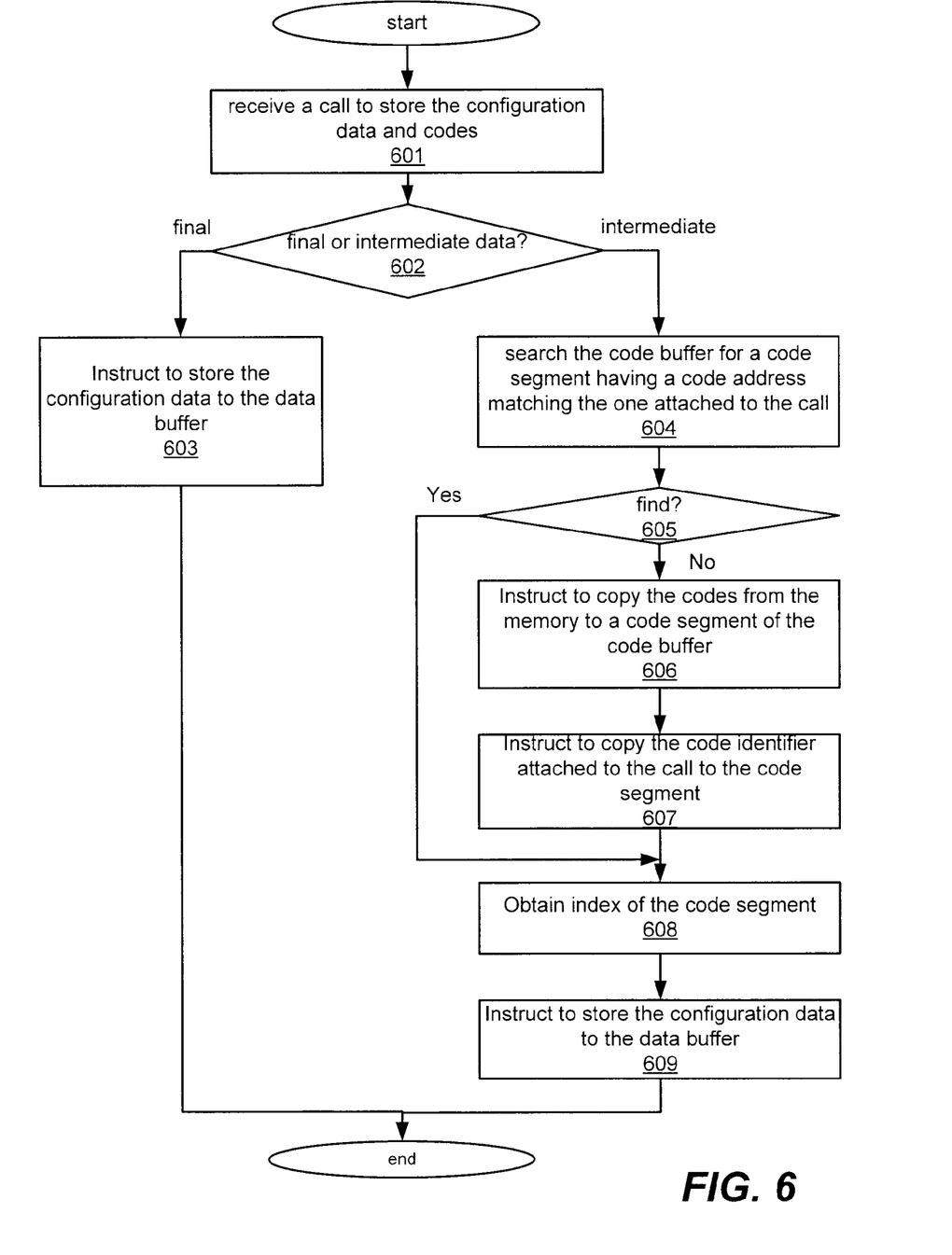
FIG. 6 is an embodiment of a method of storing the configuration data and associated codes respectively to the data buffer and code buffer.

FIG. 6 shows an embodiment of a method of storing the configuration data and associated codes respectively to the data buffer and code buffer. In block 601, configuration update handler 22 may receive a call from interrupt event handler 21 to ask for an instruction on how to store the attached configuration data and codes in data buffer 23 and code buffer 24. Besides the configuration data and codes, the call may further include the data indicator to indicate whether the configuration data is the final configuration data or the intermediate configuration data, the register address associated with the configurable device, and the code identifier to identify the codes.

In block 602, configuration update handler 22 may determine if the configuration data is the final configuration data or the intermediate configuration data based upon the data indicator attached to the call from interrupt event handler 21. In response to the final configuration data, configuration update hander 22 may instruct interrupt event handler 21 to store the data indicator, the configuration data and the register address in a data segment of data buffer 23, as depicted in FIG. 3. Since the configuration data is the final data, interrupt event handler 21 may store meaningless information as the code segment index in the data segment.

If the configuration data is the intermediate data, configuration update handler 21 may search code buffer 21 for a code segment having a code identifier matching the one received from interrupt event handler 21 in block 604. In block 605, configuration update handler 22 may determine if the code segment may be found. If it is found, then configuration update handler 22 may obtain an index of the code segment in block 608 and instruct interrupt event handler 21 to store the data indicator, the register address, the configuration data, and the code segment index in data buffer 23, as depicted in FIG. 3, in block 609.

However, if the code segment is not found in block 605, then configuration update handler 22 may instruct interrupt event handler to copy the codes from the memory associated with interrupt event handler 21 to a code segment of code buffer 24 in block 606, and instruct interrupt event handler 21 to copy the code identifier associated with the codes to the code segment in block 607. Configuration update handler 22 may obtain an index of the code segment in block 608, and may instruct interrupt event handler 21 to store the data indicator, the register address, the configuration data and the code segment index in a data segment of data buffer 23, as depicted in FIG. 3.

Figure 7:
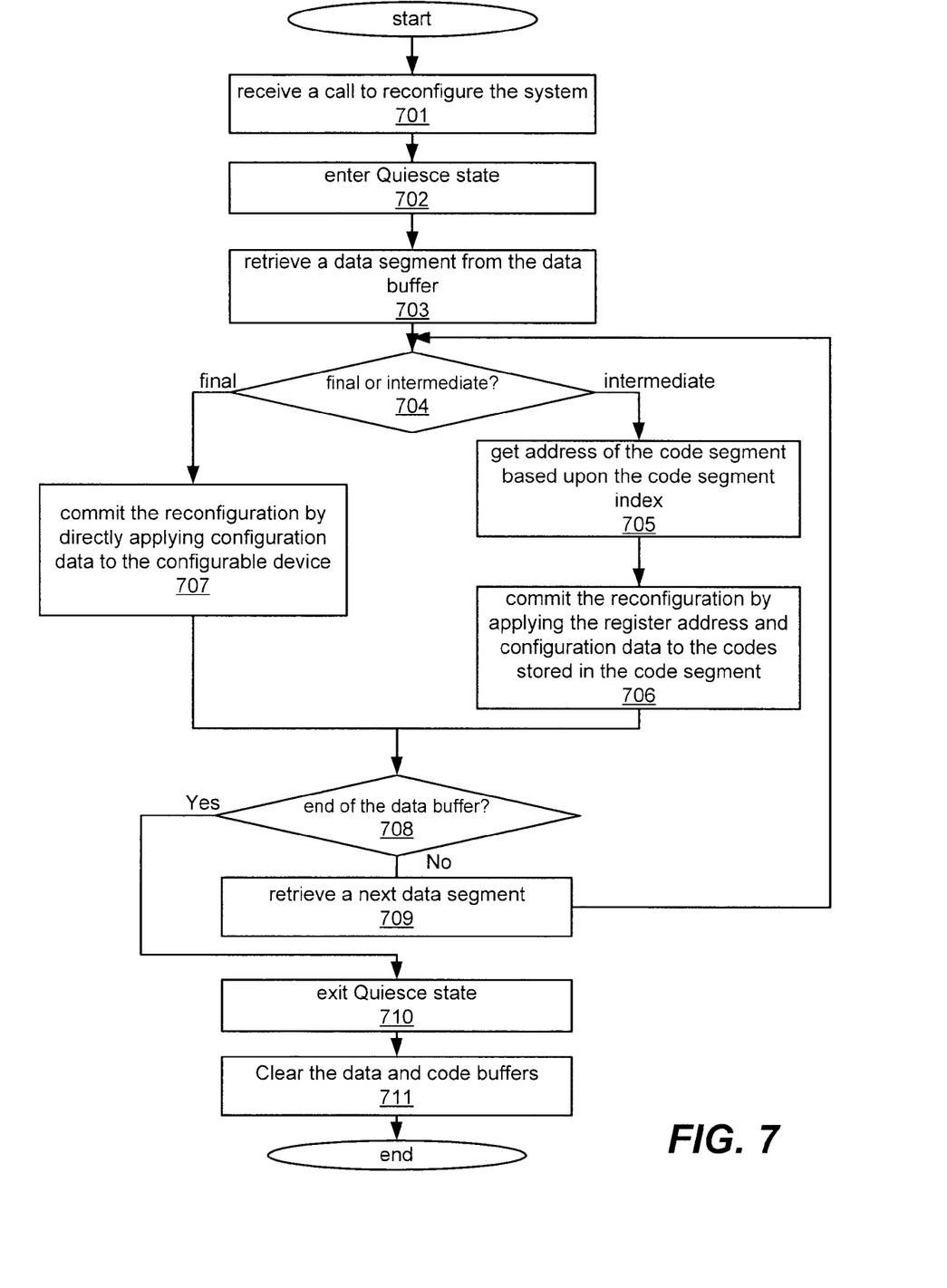
FIG. 7 is an embodiment of a method of reconfiguring the computing system.

FIG. 7 illustrates an embodiment of a method of reconfiguring computing system 10. In block 701, configuration update handler 22 may receive a call from interrupt event handler 21 to reconfigure system 10. In block 702, configuration update handler 22 may force the system into a quiesce state. Then, configuration update handler 22 may retrieve a data segment from data buffer 23 in block 703. As stated above, the data segment may store a data indicator, a register address, a configuration data and a code segment index. Then, configuration update handler 22 may determine if the configuration data stored in the data segment is final configuration data or intermediate configuration data based upon the data indicator in block 704.

In response that the configuration data is the intermediate configuration data, configuration update handler 22 may obtain an address of a code segment of code buffer 24 based upon the code segment index stored in the data segment in block 705. In block 706, configuration update handler 22 may commit the reconfiguration by applying the register address and configuration data to the codes stored in the code segment.

However, if the configuration data is determined to be the final configuration data in block 704, then in block 707, configuration update handler 22 may commit the reconfiguration by directly applying the configuration data to the configurable device, e.g., writing the configuration data to the register address associated with the configurable device.

In block 708, configuration update handler 22 may determine if the data segment retrieved in block 703 is the last segment of data buffer 23. If so, configuration update handler 22 may force the system out of the quiesce state in block 710 and clear data buffer 23 and code buffer 24 in block 711. Then, control of the system may be returned to the OS. However, if not, configuration update handler 22 may retrieve a next data segment from data buffer 23 and repeat operations in blocks 704-708.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising: during a non-quiesce state of a system,
    calculating configuration data for a configuration update of a configurable device of the system;
    determining if the configuration data is final configuration data or intermediate configuration data, wherein the final configuration data is used to directly enact the configuration update during a quiesce state of the system, while the intermediate configuration data is used to indirectly enact the configuration update during the quiesce state of the system; and
    determining codes associated with the configuration data if the configuration data is the intermediate configuration data, wherein the codes are used to operate the configuration data to obtain the final configuration data during the quiesce state of the system.

2. The method of claim 1, further comprising: during the non-quiesce state of the system,
    storing the configuration data in a data buffer; and
    storing the codes in a code buffer.

3. The method of claim 2, further comprising: during the non-quiesce state of the system,
    generating an indicator to indicate if the configuration data is the final configuration data or the intermediate configuration data; and
    storing the indicator in the data buffer.

4. The method of claim 2, further comprising: during the quiesce state of the system,
    extracting the configuration data from the data buffer;
    updating a configuration of the configurable device by directly applying the configuration data to the configurable device, if the configuration data is the final configuration data; and
    extracting the codes from the code buffer and updating the configuration of the configurable device by applying the configuration data to the codes, if the configuration data is the intermediate configuration data.

5. The method of claim 2, wherein the storing the configuration data further comprises:
    if the configuration data is the final configuration data, then storing the data and a first data indicator which indicates that the configuration data is the final configuration data to a data segment of the data buffer; and
    if the configuration data is the intermediate configuration data, then
        searching the code buffer for a code segment that stores the codes associated with the configuration data; and
        storing the configuration data, a second data indicator which indicates the configuration data is the intermediate data and an index of the code segment in the data segment of the data buffer, if the code segment is found.

6. The method of claim 5, wherein the storing the codes further comprises if the code segment is not found, then storing the codes and a code identifier that identifies the codes into another code segment of the code buffer, so that the configuration data, the second data indicator and another index of the another code segment can be stored in the data segment of the data buffer when storing the configuration data.

7. The method of claim 1, wherein the configurable device is a common system interface (CSI) device.

8. A system, comprising:
    an event handler to during a non-quiesce state of the system,
        calculate configuration data for a configuration update of a configurable device of the system;
        determining if the configuration data is final configuration data or intermediate configuration data, wherein the final configuration data is used to directly enact the configuration update, while the intermediate configuration data is used to indirectly enact the configuration update; and
        determining codes associated with the configuration data if the configuration data is the intermediate configuration data, wherein the codes are used to operate the configuration data to obtain the final configuration data; and
    a configuration update handler to during a quiesce state of the system,
        update a configuration of the configurable device by directly applying the configuration data to the configurable device, if the configuration data is the final configuration data; and update the configuration of the configurable device by applying the configuration data to the codes, if the configuration data is the intermediate configuration data.

9. The system of claim 8, further comprising:
a data buffer to store the configuration data; and
a code buffer to store the codes.

10. The system of claim 9, wherein the configuration update handler further during the non-quiesce state of the system:
if the configuration data is the final configuration data, then instructs the event handler to store the data and a first data indicator which indicates that the configuration data is the final configuration data to a data segment of the data buffer; and
if the configuration data is the intermediate configuration data, then
searches the code buffer for a code segment that stores the codes associated with the configuration data; and
instructs the event handler to store the configuration data, a second data indicator which indicates the configuration data is the intermediate data and an index of the code segment in the data segment of the data buffer, if the code segment is found.

11. The system of claim 10, wherein the configuration data handler further, during the non-quiesce state of the system, instructs the event handler to store the codes and a code identifier that identifies the codes in another code segment of the code buffer and to store the configuration data, the second data indicator and another index of the another code segment in the data segment of the data buffer, if the code segment is not found.

12. The system of claim 8, wherein the configurable device is a common system interface (CSI) device.

13. A computer-readable storage medium comprising a plurality of instructions that in response to being executed result in a system: during a non-quiesce state of a system,
calculating configuration data for a configuration update of a configurable device of the system;
determining if the configuration data is final configuration data or intermediate configuration data, wherein the final configuration data is used to directly enact the configuration update during a quiesce state of the system, while the intermediate configuration data is used to indirectly enact the configuration update during the quiesce state of the system; and
determining codes associated with the configuration data if the configuration data is the intermediate configuration data, wherein the codes are used to operate the configuration data to obtain the final configuration data during the quiesce state of the system.

14. The computer-readable storage medium of claim 13, wherein the plurality of instructions further result in the system during non-quiesce state of the system,
storing the configuration data in a data buffer; and
storing the codes in a code buffer.

15. The computer-readable storage medium of claim 14, wherein the plurality of instructions further result in the system: during a non-quiesce state of the system,
generating an indicator to indicate if the configuration data is the final configuration data or the intermediate configuration data; and
storing the indicator in the data buffer.

16. The computer-readable storage medium of claim 14, wherein the plurality of instructions further result in the system during a quiesce state of the system,
extracting the configuration data from the data buffer;
updating a configuration of the configurable device by directly applying the configuration data to the configurable device, if the configuration data is the final configuration data; and
extracting the codes from the code buffer and updating the configuration of the configurable device by applying the configuration data to the codes, if the configuration data is the intermediate configuration data.

17. The computer-readable storage medium of claim 14, wherein the plurality of instructions that result in the system storing the configuration data, further result in the system:
if the configuration data is the final configuration data, then storing the data and a first data indicator which indicates that the configuration data is the final configuration data to a data segment of the data buffer; and
if the configuration data is the intermediate configuration data, then
searching the code buffer for a code segment that stores the codes associated with the configuration data; and
storing the configuration data, a second data indicator which indicates the configuration data is the intermediate data and an index of the code segment in the data segment of the data buffer, if the code segment is found.

18. The computer-readable storage medium of claim 17, wherein the plurality of instructions that result in the system storing the codes further result in the system:
if the code segment is not found, then storing the codes and a code identifier that identifies the codes into another code segment of the code buffer, so that the configuration data, the second data indicator and another index of the another code segment can be stored in the data segment of the data buffer when storing the configuration data.

19. The computer-readable storage medium of claim 13, wherein the configurable device is a common system interface (CSI) device.

* * * * *